2,925,408

POLYMERIZATION OF GASEOUS OLEFINS BY MEANS OF A CATALYST CONSISTING ESSENTIALLY OF PYROPHORIC IRON AND OXYGEN

Ivor W. Mills, Glenolden, Pa., assignor to Sun Oil Company, Philadelphia, Pa., a corporation of New Jersey No Drawing. Application June 28, 1956
Serial No. 594,399

9 Claims. (Cl. 260—88.2)

This invention relates to the polymerization of normally gaseous olefins, and is particularly directed to the preparation of solid polymers of ethylene or propylene, or to the preparation of solid copolymers of ethylene and propylene.

An object of the invention is to provide a process for the preparation of solid polymers of normally gaseous olefins under low temperature and pressure conditions. Another object is to provide a process for the preparation of solid polymers of normally gaseous olefins which uses inexpensive and readily available materials, and in which an essential component of the reaction mixture can be easily regenerated. Other objects and their achievement in accordance with the process of the invention will be apparent hereinafter.

It has now been found that by bringing together oxygen and pyrophoric iron in the presence of a normally gaseous olefin dissolved in a liquid organic reaction medium, as hereinafter described, the normally gaseous olefin is rapidly converted to solid polymers.

In an embodiment of the invention, pyrophoric iron is maintained in suspension in a hydrocarbon reaction medium by mechanical agitation and ethylene containing a minor proportion of oxygen is bubbled into the mixture under polymerizing conditions. Solid polymers of the olefin are formed and are readily recoverable from the reaction mixture.

The pyrophoric iron used in the process of the invention is obtained by the reduction of iron compounds. The reduction is preferably performed by maintaining a reducible iron compound such as an iron oxide, oxalate, acetate, halide, nitrate, or the like in a stream of hydrogen at a temperature of from 200° C. to 600° C. until the iron compound is reduced to metallic iron. Iron hydride, in addition to metallic iron, may be present together with the metal. By the expression "pyrophoric iron," as used herein, is meant substantially metallic iron which ignites when contacted with oxygen, and which may contain a portion of iron hydride. Generally, the pyrophoric iron is in the form of finely divided particles. However, the iron may be deposited on a substantially inert carrier material such as alumina. The pyrophoric iron may also be prepared from naturally occurring ores such as bauxite. Bauxite, which consists principally of hydrated oxides of aluminum, contains varying quantities of iron, say from about 0.5% to 50% by weight (calculated as $Fe_2O_3$). Bauxite, preferably in the form of finely divided particles, when heated to a temperature of from about 200° C. to 600° C. in an atmosphere of hydrogen is suitable for use in the process, since the iron compounds therein are substantially converted to pyrophoric iron by the treatment with hydrogen as described.

Ethylene, propylene, and mixtures of ethylene and propylene are the normally gaseous olefins used in the process. These olefins can be obtained from any source. Paraffins such as ethane, propane and the like can be present up to about 25% by weight of the normally gaseous olefin and good results obtained. Other olefins such as butenes, styrene, or the like can be present up to about 25% by weight of the normally gaseous olefin employed, and such olefins appear to copolymerize with the normally gaseous olefins to give copolymers.

An organic reaction medium which is liquid and substantially inert in the process must be employed. Saturated hydrocarbons including paraffins such as the butanes, pentanes, hexanes, octanes, decanes, and mixtures thereof, cycloparaffins, such as cyclopentane, alkyl substituted cyclopentanes, cyclohexane, alkyl substituted cyclohexanes, decalin, and mixtures thereof with each other and with paraffins, give good results. Aromatic hydrocarbons, such as benzene, toluene, xylene, the trimethyl benzenes, mixtures thereof and the like can also be used if desired. Inert ethers can be used in some instances with good results. Hydrocarbons are preferred for use as the reaction medium, and the process is hereafter described principally as using a hydrocarbon reaction medium.

In operating the process of the invention, it is essential that the pyrophoric iron and oxygen be brought together only in the presence of a normally gaseous olefin dissolved in a hydrocarbon reaction medium, since otherwise the catalytic condition essential for the polymerization of the olefin is destroyed. The process is conveniently performed by preparing a slurry of pyrophoric iron in a hydrocarbon reaction medium and bubbling a mixture of ethylene and oxygen therein. The ethylene and/or oxygen can be continuously or periodically introduced as desired. In a preferred embodiment of the process, a liquid stream of a hydrocarbon reaction medium containing pyrophoric iron in suspension is continuously admixed with a liquid stream of ethylene dissolved in a hydrocarbon reaction medium and oxygen. It is advantageous to preheat the stream containing ethylene and oxygen to an elevated temperature, say from about 100° F. to 300° F. prior to the admixing. Iron oxide, formed in the process by reaction between pyrophoric iron and oxygen, is continuously removed from the resulting reaction mixture, such as by decanting or filtering, and solid polymer products thereafter recovered from the hydrocarbon reaction medium.

The solid polymer products may be dissolved, suspended or both dissolved and suspended in the hydrocarbon reaction medium. Separation of the polymer product is preferably accomplished after separating the iron oxide product of reaction between the pyrophoric iron and oxygen from the reaction mixture. The polymer products are conveniently precipitated from the hydrocarbon reaction medium by reducing the temperature thereof, which precipitates the dissolved polymers and by filtering, washing and drying the precipitated polymers.

The quantity of pyrophoric iron to employ can be varied substantially. Usually 1 part by weight of pyrophoric iron to from 5 to 1,000 or more parts of hydrocarbon reaction medium will be used. The quantity of oxygen to employ is small compared to the quantity of ethylene, 1 part by weight of oxygen to from 20 to 1,000 parts of ethylene giving good results. The introduction of only a small proportion of oxygen, together with ethylene, gives a relatively high molecular weight polymer product, while larger proportions give polymers of lower molecular weight. When the pyrophoric iron has been converted to an iron oxide, the catalytic condition necessary for polymerization initiation no longer exists, and the process is discontinued. The iron oxide is readily removed, such as by decanting, and can be regenerated by heating in an atmosphere of hydrogen as described for the preparation of pyrophoric iron. If any polymer product adheres to the iron oxide, it is removed by dissolving in a solvent, such as xylene, at an elevated temperature, or by heating in oxygen prior to heating in hydrogen.

The reaction mixture, during the preparation of the polymer product of the invention, should be maintained at a temperature of from about 50° C. to 300° C. and a pressure of from atmospheric to 1,000 p.s.i.g. The pressure must be sufficient to maintain the hydrocarbon reaction medium in the liquid phase. The time required for the polymerization will vary according to the reaction conditions, the usual time varying from a few minutes to several hours, although longer times can be used. While the invention requires that ethylene be dissolved in the hydrocarbon reaction medium, it should be understood that in many instances an atmosphere of ethylene or ethylene in gas phase dispersed in the hydrocarbon reaction medium will be present. As the dissolved ethylene is consumed, such ethylene in gas phase will be dissolved in the hydrocarbon reaction medium, thereby supplying additional ethylene to the process.

The products of the invention can vary from waxy-like solids having molecular weights of from about 300 to 800 to hard resinous products having molecular weights of above 100,000. These products are useful as thin films for wrapping food products, for preparing pipes for transporting liquids, for containers for corrosive liquids and the like. Such products can be prepared by extrusion, molding, or other fabricating means.

The following examples illustrate embodiments of the invention in which "parts" refers to parts by weight.

Example 1

Bauxite containing about 13% iron (calculated as $Fe_2O_3$), and having a particle size of about 200 mesh (United States Series), is heated to a temperature of 400° C. in a stream of hydrogen for about 4 hours. The resulting composition contaning pyrophoric iron is introduced, while being maintained in an inert atmosphere of hydrogen, into a freshly distilled quantity of isooctane, 10 parts of bauxite being added to 100 parts of the isooctane. A mixture of ethylene and oxygen containing 1 part of oxygen to 300 parts of ethylene is slowly bubbled into the hydrocarbon containing bauxite while maintaining vigorous agitation therein. The temperature of the reaction mixture is maintained at 100° C. and the pressure at substantially atmospheric pressure. After 1 hour, during which time a total of 28 parts of ethylene is added, a finely divided white precipitate appears. The reaction is stopped and the bauxite separated by decanting. The hydrocarbon reaction mixture is then cooled to about 20° C. and a quantity of finely divided, while polymer product precipitated. The polymer product is separated by filtering and after drying, appears as snow-white solids having molecular weights of about 30,000.

Example 2

Powdered iron oxalate is heated in a stream of hydrogen at a temperature of 450° C. for 2 hours. The resulting pyrophoric iron is introduced into moisture and oxygen-free isooctane maintained under an atmosphere of nitrogen, 1 part of pyrophoric iron being added to 100 parts of the isooctane. The resulting mixture is agitated and a mixture of ethylene and oxygen bubbled into the mixture over a period of 2 hours, the temperature of the reaction mixture during the ethylene-oxygen addition being maintained at about 110° C. and the pressure at substantially atmospheric pressure. A total of 50 parts of ethylene and about 0.5 part of oxygen was added. The reaction mixture contains a small quantity of finely divided white precipitate. The iron oxide was separated from the hydrocarbon medium and additional polymer precipitated by cooling to 20° C. The polymer product was recovered as described for Example 1 and appeared to be substantially similar thereto.

The foregoing examples illustrate embodiments of the invention. When other reaction conditions, or other olefins or mixtures of olefins, within the limits herein described are used, substantially equivalent results are obtained.

The invention claimed is:

1. Process for polymerizing a normally gaseous olefin which comprises bringing together, in a substantially inert liquid hydrocarbon reaction medium at a temperature of from about 50° C. to 300° C., pyrophoric iron and oxygen in the presence of a normally gaseous olefin dissolved in said hydrocarbon reaction medium, and recovering solid polymers of said olefin from the reaction mixture.

2. Process according to claim 1 wherein said normally gaseous olefin is ethylene.

3. Process according to claim 1 wherein said normally gaseous olefin is propylene.

4. Process according to claim 1 wherein said normally gaseous olefin is a mixture of ethylene and propylene.

5. Process for preparing solid polymers of ethylene which comprises heating bauxite containing from about 0.5 to 50% by weight iron (calculated as $Fe_2O_3$) to a temperature of from 200° C. to 600° C. in an atmosphere of hydrogen sufficient to convert the iron in the bauxite to pyrophoric iron, introducing the resulting bauxite containing pyrophoric iron into a liquid hydrocarbon reaction medium, and introducing ethylene containing a minor proportion of oxygen into the liquid hydrocarbon reaction medium.

6. Process for polymerizing a normally gaseous olefin which comprises bringing together in a substantially inert liquid hydrocarbon reaction medium at a temperature of from about 50° C. to 300° C., pyrophoric iron and oxygen in the presence of a normally gaseous olefin dissolved in said hydrocarbon reaction medium, the proportions by weight of said pyrophoric iron to said reaction medium being between about 1 to 5 and 1 to 1,000, and the proportions by weight of oxygen to said normally gaseous olefin being between about 1 to 20 and about 1 to 1,000, and recovering solid polymers of said olefins from the reaction mixture.

7. Process according to claim 6 wherein said normally gaseous olefin is ethylene.

8. Process according to claim 6 wherein said normally gaseous olefin is propylene.

9. Process according to claim 6 wherein said normally gaseous olefin is a mixture of ethylene and propylene.

References Cited in the file of this patent
UNITED STATES PATENTS
2,381,198    Bailey et al.   _____ Aug. 7, 1945